United States Patent
Mattsson

(10) Patent No.: US 11,383,501 B2
(45) Date of Patent: *Jul. 12, 2022

(54) NET REPLACEMENT FILM

(71) Applicant: TRIOPLAST AB, Smålandsstenar (SE)

(72) Inventor: Robert Mattsson, Skärhamn (SE)

(73) Assignee: Trioplast AB, Smålandsstenar (NO)

( * ) Notice: Subject to any disclaimer, the term of this patent is extended or adjusted under 35 U.S.C. 154(b) by 160 days.

This patent is subject to a terminal disclaimer.

(21) Appl. No.: 16/624,165

(22) PCT Filed: Jun. 21, 2018

(86) PCT No.: PCT/EP2018/066584
§ 371 (c)(1),
(2) Date: Dec. 18, 2019

(87) PCT Pub. No.: WO2018/234449
PCT Pub. Date: Dec. 27, 2018

(65) Prior Publication Data
US 2020/0223200 A1 Jul. 16, 2020

(30) Foreign Application Priority Data

Jun. 22, 2017 (EP) ..................... 17177314

(51) Int. Cl.
*B32B 27/32* (2006.01)
*B32B 27/08* (2006.01)
(Continued)

(52) U.S. Cl.
CPC ............ *B32B 27/327* (2013.01); *B32B 27/08* (2013.01); *A01F 15/0715* (2013.01);
(Continued)

(58) Field of Classification Search
CPC ..... B32B 27/327; B32B 27/08; B32B 27/306; B32B 2250/03; B32B 2270/00;
(Continued)

(56) References Cited

U.S. PATENT DOCUMENTS

2009/0269566 A1* 10/2009 Eichbauer ............... B32B 27/16
428/220
2013/0032046 A1* 2/2013 Ohm .................... A01F 15/0715
100/40

FOREIGN PATENT DOCUMENTS

EP 3184301 A1 6/2017
FR 3022732 A1 1/2016
(Continued)

OTHER PUBLICATIONS

B.A. Krentsel et al., Structure and Properties of Ethylene/[alpha]-Olefin Copolymers: Mechanical Properties, in Polymers and Copolymers of Higher [alpha]-Olefins, Jan. 1, 1997, XP055430312.

*Primary Examiner* — Michael C Miggins
(74) *Attorney, Agent, or Firm* — Avek IP, LLC

(57) ABSTRACT

A prestretched polyethylene film is provided having a longitudinal degree of prestretching in the range of from 100% to 400% and a remaining longitudinal elongation capability in the range of from 100% to less than 300% as determined according to ASTM D882. The film comprises at least 25% by weight of a linear low density polyethylene (LLDPE) substantially free from long chain branching (LCB) and having a density below 915 kg/m$^3$. The film is particularly useful as a net replacement film in the baling of compressed bulk material, such as silage, and may offer to users improved flexibility and reliability and/or increased yield.

19 Claims, 2 Drawing Sheets

(51) Int. Cl.
 *B29C 48/08* (2019.01)
 *A01F 15/07* (2006.01)
 *B29K 23/00* (2006.01)
 *B32B 27/30* (2006.01)

(52) U.S. Cl.
 CPC ....... *A01F 2015/0745* (2013.01); *B29C 48/08* (2019.02); *B29K 2023/0625* (2013.01); *B29K 2023/083* (2013.01); *B32B 27/306* (2013.01); *B32B 2250/03* (2013.01); *B32B 2270/00* (2013.01); *B32B 2307/72* (2013.01)

(58) Field of Classification Search
 CPC ............. B32B 2307/72; A01F 15/0715; A01F 2015/0745; B29C 48/08; B29K 2023/0625; B29K 2023/083
 See application file for complete search history.

(56) References Cited

FOREIGN PATENT DOCUMENTS

| | | |
|---|---:|---|
| WO | 9967080 A1 | 12/1999 |
| WO | 2008155129 A1 | 12/2008 |
| WO | 2009040129 A2 | 4/2009 |
| WO | 2011076694 A1 | 6/2011 |
| WO | 2017108891 A1 | 6/2017 |

\* cited by examiner

NET REPLACEMENT FILM

CROSS-REFERENCE TO RELATED APPLICATIONS

This application is the U.S. national phase of, and claims priority to International Application No. PCT/EP2018/066584, filed Jun. 21, 2018, which designated the U.S. and which claims priority to European Patent Application No. EP 17177314.6, filed Jun. 22, 2017, the disclosures of each of which are incorporated by reference herein in their entireties.

FIELD OF THE INVENTION

The invention relates to a prestretched polyethylene film useful as a net replacement film in the production of bales of compressed bulk material.

BACKGROUND

Plastic film is used for many different purposes. For example, plastic stretch film is frequently used in different fields of application, in particular for wrapping various products, for example wrapping goods for shipping or storing, or for wrapping bulk products, including agricultural products such as grass and various crops for silage production.

In silage production, a baler is first used to form compact bales of the agricultural bulk product, which are wrapped tightly with net, twine or film to retain the shape of the bale. Once the net, twine or film is lying around the bale, the formed bale is ejected from the baling chamber. For the production of silage, which requires anaerobic conditions, a protective wrapping film is then applied around the compressed and netted bale. The protective film should provide a barrier against moisture, oxygen and UV light.

However, the conventional use of a net for retaining the shape of the bale has several drawbacks. The net, which is generally made of high density polyethylene or polypropylene ribbons, is difficult to cut open when silage is to be extracted from the bale. The net also easily entangles with the silage. For these reasons, the used netting is difficult to recycle, especially since it must be sorted from the protective wrapping film, which is generally made of linear low density polyethylene. In view of these disadvantages, it has been suggested to replace the net with a film in order to improve the protection of the bale, facilitate the handling and/or to facilitate recycling of the material. However, conventional protective wrapping films cannot be used for this purpose since these films in general are not stiff enough to be able to substantially retain the compressed shape of the bale, but allow too much expansion of the compressed material. Furthermore, when such films are stretched before being applied on a bale, a neck-in or constriction is obtained, i.e. a narrowing of the film width, which may result in a single layer of film not covering the bale as desired. If a net replacement film is not applied to cover the entire width of a round bale, the compressed product will expand at the edges of the bale, resulting in permanently weak areas at the edges when the bale is subsequently wrapped with protective wrapping film and the formation of wedge-shaped air pockets near the edges of the bale.

WO 2008/155129 is concerned with the above disadvantages and suggests a net replacement film, which is a pre-stretched film which has been stretched in the longitudinal direction to at least 60% of its elongation percentage at break, so that in the longitudinal direction the film only has an elongation capability of maximum 180% left. However, the film of WO 2008/155129 suffers from the drawback that it is very susceptible to mechanical damage. In use, if the film is punctured or tears, the tear may spread rapidly over the entire width of the film, increasing the risk for exposure of the content of the bale to moisture and oxygen. Furthermore, a net replacement film that is severely torn could affect the shape of the bale or even lead to collapse of the bale.

WO 2011/076694 discloses another net replacement film, more particularly a prestretched polyethylene film having a longitudinal stretch ratio of from about 1:2 to about 1:4, and having a longitudinal elongation capability of at least 170%, preferably at least 190%. The elongation capability includes an elastic component. The film of WO 2011/076694 is more stretchable than the film of WO 2008/155129, and exhibits an advantageous balance between elongation capability and neck-in which makes it particularly useful for wrapping of compressed bulk material, e.g. for the production of silage.

However, despite the above-mentioned films, there remains a need in the art for improved films for use as net replacement in the process of baling of compressed bulk material.

SUMMARY OF THE INVENTION

It is one object of the invention to at least partly overcome the problems in the prior art, and to provide a prestretched polyethylene film with improved properties, useful as a net replacement film for baling of compressed bulk material.

According to a first aspect of the invention, this and other objects are achieved by a prestretched polyethylene film having a longitudinal degree of prestretching in the range of from 100% to 400% and a remaining longitudinal elongation capability in the range of from 100% to less than 300% as determined according to ASTM D882, wherein the film includes at least 25% by weight of a linear low density polyethylene (LLDPE) substantially free from long chain branching (LCB) and having a density of below 915 kg/m$^3$, such as between 910 and 915 kg/m$^3$.

The inventive film has at least 25% by weight of LLDPE that is substantially free from LCB and has a density below 915 kg/m$^3$, such as between 910 kg/m$^3$ and 915 kg/m$^3$. Using this particular type of linear low density polyethylene has been found to allow higher degrees of prestretching with retained high elongation capability.

The inventive films have also been found to exhibit similar or better mechanical properties, for instance in terms of impact resistance and ultimate tensile strength, as compared to the corresponding prior art films comprising higher density LLDPE instead of the LLDPE substantially free from LCB and having a density below 915 kg/m$^3$, such as between 910 kg/m$^3$ and 915 kg/m$^3$. The mechanical performance of the inventive films especially in combination with the high remaining elongation capability, indicates that these films will tolerate mechanical stress and wear better than prior films, and that the inventive films as a result may offer improved yield, reliability and/or flexibility to users, especially in the field of silage baling.

The term "mechanical properties" or "mechanical performance" as used herein mainly means the mechanical strength of the material, measured in terms of at least one of tensile strength, tear strength, and impact resistance. Tensile strength, measured as force per unit area, is defined as the maximum stress that a material can withstand while being stretched or pulled before failing or breaking, and can be determined according to ASTM D882 or ISO 527-3. Tear strength, typically measured as force per unit length, is defined as the resistance of a material to the growth of, e.g. a cut, when under tension. Elongation at break is defined as the ultimate elongation (given as percentage of the initial length) of a material before it breaks under tension. Impact resistance (dart drop), typically measured as mass, e.g. according to the standard ASTM D1709, is defined as the relative ability of a material to withstand a falling dart without breaking.

In embodiments, the prestretched polyethylene film may have at least 35%, preferably at least 40%, by weight of the LLDPE substantially free from LCB. For example, the prestretched polyethylene film may include in the range of 35-95%, preferably in the range of 40-95%, by weight of the LLDPE substantially free from LCB.

According to some embodiments, the LLDPE substantially free from LCB has a density of between 911 and 913 kg/m$^3$, preferably a density of about 912 kg/m$^3$.

The portion of the prestretched polyethylene film not made up of the LLDPE substantially free from LCB and having a density below 915 kg/m$^3$ may include other types of LLDPE, LDPE, and other polyolefins and additives commonly used in the manufacture of prestretched polyethylene films. According to some embodiments, the prestretched polyethylene film comprises a mixture of LLDPE substantially free LCB and having a density below 915 kg/m$^3$ and higher density LLDPE, wherein the LLDPE mixture has a density below 916 kg/m$^3$, below 915 kg/m$^3$, or even below 914 kg/m$^3$.

Prestretched polyethylene films are commonly produced from LLDPE. LLDPE is used in stretch films due to its favorable characteristics in respect of, e.g., tensile strength, elongation at break and puncture resistance. The LLDPE used in polyethylene films, particularly films for agricultural applications, can be LLDPE prepared using a Ziegler Natta or Philips type catalyst and a comonomer, such as octene, to provide a suitable degree of short chain branching. This type of LLDPE typically has a density of about 918 kg/m$^3$. The LLDPE may also be prepared using a metallocene catalyst and a comonomer, such as octene. Metallocene catalysts may lead to the formation of a small degree of LCB in addition to the short chain branching.

The LLDPE used in the inventive prestretched polyethylene films is preferably, but not necessarily, LLDPE prepared using a Ziegler Natta type catalyst and a comonomer, such as hexene, heptene or octene, or a mixture thereof, to provide a suitable degree of short chain branching, and no or substantially no long chain branching. The LLDPE used in the inventive prestretched polyethylene films has a low density compared to LLDPE typically used in prior art polyethylene films, particularly films for agricultural applications.

According to some embodiments, the LLDPE substantially free from LCB is an LLDPE is produced using a Ziegler Natta catalyst and hexene, heptene or octene or a mixture thereof as comonomer. In some embodiments the comonomer is hexene or octene. In some preferred embodiments the comonomer is octene.

According to some embodiments, LDPE) substantially free from long LCB has a melt flow index (MI) in the range of 0.7-1.3 g/10 min, 0.9-1.1 g/10 min, or about 1 g/10 min, as determined according to ASTM D1238 at 190° C. with a 2.16 kg weight.

The expression "prestretched polyethylene film" as used herein means that the polyethylene film is stretched in the longitudinal direction during the film production process before being wound onto rolls. Stretching is typically performed in a prestretch unit of the production line and involves passing the film between two or more stretching rollers rotating at different speeds. The prestretching may preferably be performed directly after the extrusion or film blowing steps, while the film is still hot. Typically, prestretching is followed by relaxation of the film. The expression "degree of prestretching" is intended to mean the difference in length, in percent, between the prestretched film after manufacture (i.e. after passing the film through the prestretch unit and following relaxation of the film) and the initial film length. As used herein, the degree of prestretching thus refers to the increase in film length relative to the length of the film prior to stretching. It may be noted that the degree of prestretching affects mechanical properties of the film, such that a prestretched film behaves differently e.g. when subjected to further stretching compared to a non-prestretched film.

The prestretched polyethylene film has a longitudinal degree of prestretching in the range of from about 100% to 400%, about 130% to 400%, about 150% to 400%, about 200% to 350%, about 200% to 320%, about 200% to 300%, or from about 200% to 270%.

Furthermore, the prestretched polyethylene film has a remaining longitudinal elongation capability of from about 100% to less than 300%, e.g. from about 10% to 295%, about 130% to 290%, about 150% to 250%, or from about 150% to 230%, as determined according to ASTM D882.

The term "elongation capability" as used herein means the elongation percentage at break, as measured in accordance with the ASTM D882 standard, wherein a strip of film with a width of 20 mm, clamped between two clamps at a distance of 50 mm from each other is stretched at a rate of 500 mm/min until the film breaks. At least five strips of the film must be measured, and the elongation capability corresponds to the mean value of the measurements.

According to some embodiments, the thickness of the film is in the range of from 5 to 50 μm, for example from 5 to 35 μm, from 8 to 25 μm, or from 13 to 20 μm.

In some embodiments, the prestretched polyethylene film is a coextruded multi-layer blown film comprising at least two layers. Preferably, the prestretched polyethylene film is a multi-layer film comprising at least three layers: at least one core layer arranged between two exterior layers. The film may optionally comprise more than one core layer, for example 2-5 core layers.

According to embodiments, at least one layer comprises in the range of 40-99% by weight of the LLDPE substantially free from LCB. The at least one core layer may include in the range of 40-99% by weight of the LLDPE substantially free from LCB. In embodiments where the prestretched polyethylene film comprises multiple core layers, the core layers together may comprise 40-99% by weight of the LLDPE substantially free from LCB, based on the total weight of all core layers.

In further aspects, the invention relates to the use of a prestretched polyethylene film as described herein as a net replacement film in the production of bales of compressed bulk material. The compressed bulk material may in particular be an agricultural product, such as a crop, optionally intended for the production of silage. The inventive prestretched polyethylene film is typically applied as a first contact layer onto the compressed bulk material.

As used herein, the expression "first contact layer" means that the film is applied in direct contact with the compressed bulk material and that no other film or layer is applied between the compressed bulk material and the prestretched film according to the invention.

In yet another aspect, the invention provides a method of forming a bale of compressed bulk material, preferably a silage bale. The method includes forming a cylindrical bale of compressed bulk material, and applying a film as described herein under tension in the circumferential direction around the cylindrical bale.

In embodiments, substantially no expansion of the bale of compressed bulk material occurs when the bale is removed from the chamber following the step of applying the film under tension. In some embodiments, even a further compression of the compressed bulk material may be achieved by the prestretched polyethylene film applied around the compressed bulk material, relative to the theoretical volume of the bale within the baling chamber (i.e., the internal volume of the baling chamber). The capability of the prestretched polyethylene film to potentially also provide a further compression of the baled material, is related at least to the elongation capability of the film, and also to the capacity for elastic deformation upon further stretching.

The prestretched polyethylene film is typically applied as a first contact layer, in direct contact with the compressed bulk material. Prior to applying the film around the cylindrical bale, the film may be further stretched by about 10-50%, preferably by about 15-50%, about 15-40%, or even about 18-35%, relative to the length of the prestretched film. This further stretching is typically carried out in a baler and is controlled by the user of the film, such as a farmer. The degree of further stretching applied to the film during baling is typically chosen on the basis of the properties of the film, the ambient conditions and the properties of the bulk material (e.g., dry content) to be baled, and any limitations set by the baling equipment. Generally, a high degree of further stretching will result in increased yield as more bales can be produced per roll of film. However, too much stretching may increase the risk of mechanical damage to the film and may result in unsatisfactory bale quality and/or time-consuming interruptions during the baling process.

The inventive films have been found to possess excellent mechanical properties which, especially in combination with the high remaining elongation capability, indicate that these films will tolerate mechanical stress and wear, both during and after the baling process, better than prior films, and that the inventive films as a result may offer improved yield, reliability and/or flexibility to users.

For example, the inventive films may allow a higher degree of stretching in the baler than conventional net replacement films, thus resulting in a higher number of bales produced per roll of film (i.e., yield) under normal conditions. Furthermore, the mechanical properties of the inventive films suggest that these films may tolerate higher mechanical stress and wear, such that they may perform better than conventional films under more difficult conditions (e.g. baling of crops with high dry content). Under such circumstances, the inventive films may allow maintaining a relatively high degree of stretching in the baler, or at least a lesser decrease of the stretching applied in the baler, resulting in a high yield relative to conventional net replacement films also under more difficult conditions. Due to their more forgiving properties, the inventive prestretched polyethylene films may also be used with more variable settings in different balers. Hence, the prestretched polyethylene film may provide more reliable and flexible solution to users and may ultimately increase yield under all operative conditions.

It shall be understood that the invention relates to all possible combinations of features recited in the claims.

DETAILED DESCRIPTION OF THE INVENTION

Figure 1:
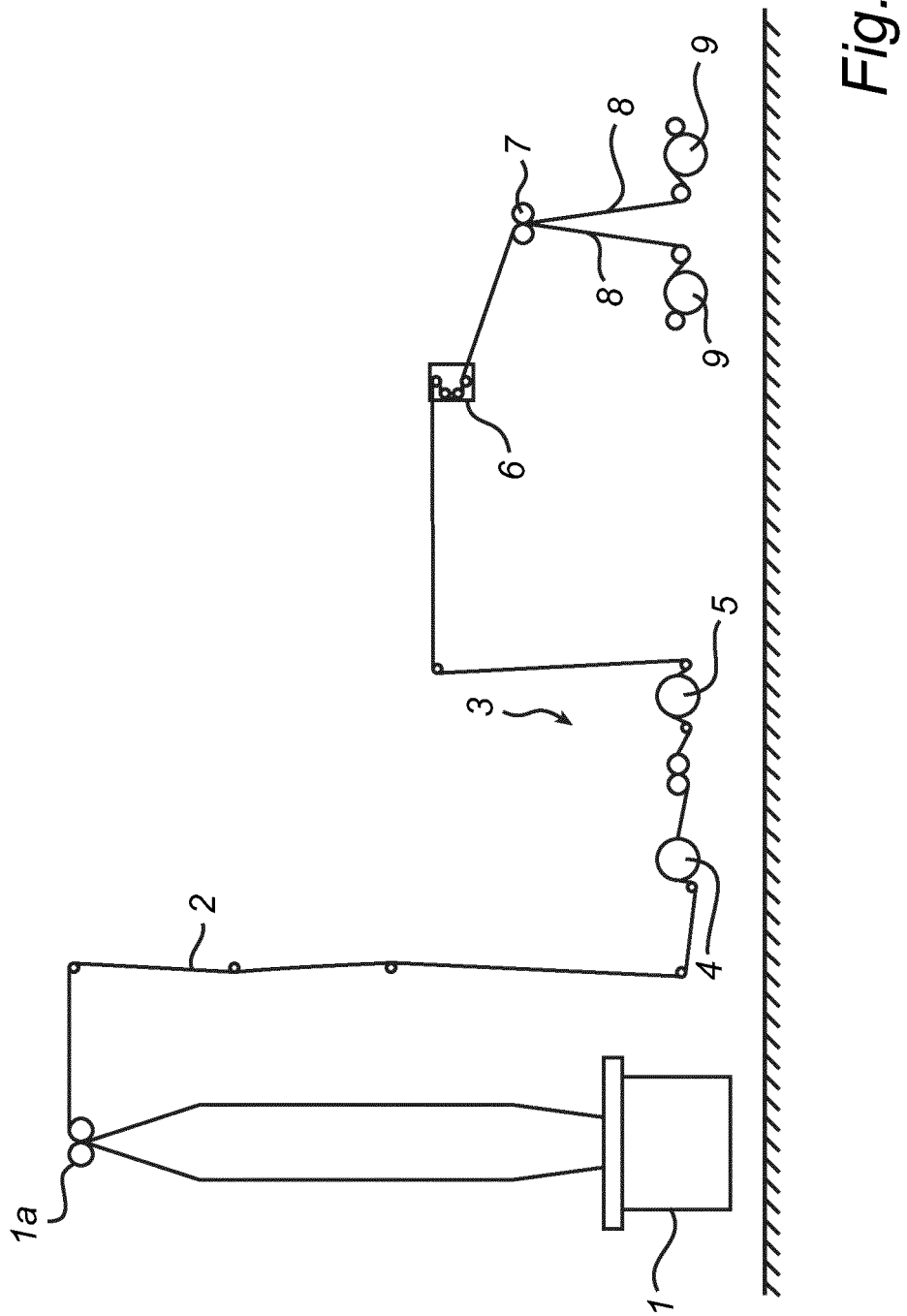
FIG. 1 is a schematic illustration of a method for producing a prestretched film of the invention.

Preferred embodiments of the invention will now be described in more detail. The invention may, however, be embodied in many different forms and should not be construed as limited to the embodiments set forth herein; rather, these embodiments are provided for thoroughness and completeness, and fully convey the scope of the invention to the skilled person.

It was surprisingly found that an improved net replacement film could be produced by including at least 25% by weight of a linear low density polyethylene (LLDPE) substantially free from long chain branching (LCB) and having a density below 915 kg/m$^3$, in particular of between 910 and 915 kg/m$^3$. The film has a longitudinal degree of prestretching in the range of from 100% to 400% and a remaining longitudinal elongation capability that makes it particularly useful as a net replacement film for silage baling.

In general, when a polymeric film (for example a polyethylene based film such as those used for wrapping of agricultural products) is stretched, the deformation may be elastic, i.e. reversible, and/or plastic, i.e. non-reversible. Initially, stretching results in completely elastic deformation, such that the film recovers its original shape when the tensile stress is released. However, at a certain degree of stretching (tensile force applied), the deformation becomes partly plastic, meaning that the polymeric material can no longer completely retain its original shape, due to molecular dislocations in the polymeric structure. Thus, the film is partly irreversibly stretched. This non-elastic property is utilized for permanently reducing the thickness of cast or blown films. The stretch level at which a polymeric film begins to undergo plastic deformation is called "yield strength" or "yield point" (in a stress-strain curve) and is dependent on the material.

Also above the yield point, the deformation of the film material is still partly elastic. Hence, the deformation occurring above the yield point has an elastic component and a plastic component. However, the more a polymeric material is stretched, the smaller the elastic component, and the more a polymeric film is stretched above the yield point, the stiffer it becomes. Eventually, if stretching is continued, the film breaks.

The prestretched polyethylene film typically has a longitudinal elongation capability in the range of from 100% to less than 300% as determined according to ASTM D882. The elongation capability typically comprises an elastic component.

As used herein, the expression "elongation capability comprising an elastic component" means that upon subsequent stretching of the prestretched polyethylene film, part of the resulting elongation is an elastic deformation. Thus, when the prestretched film is stretched again, such as during use, part of the elongation is reversible. As a result, a film that is relaxed after being wrapped under tension around a bale may exert a compressive force on the bale while partially returning to its original prestretched length.

Prestretched polyethylene films are commonly produced from LLDPE. LLDPE is used in stretch films due to its favorable characteristics in respect of e.g. tensile strength, elongation at break and puncture resistance. The LLDPE used in polyethylene films, particularly films for agricultural applications, can be LLDPE prepared using a Ziegler Natta or Philips type catalyst and a comonomer, such as octene, to provide a suitable degree of short chain branching. This type of LLDPE typically has a density of about 918 kg/m$^3$. The LLDPE may also be prepared using a metallocene catalyst and a comonomer, such as octene. Metallocene catalysts may lead to the formation of a small degree of LCB in addition to the short chain branching.

Ziegler Natta Catalyst

The LLDPE used in the inventive prestretched polyethylene films is preferably, although not necessarily, LLDPE prepared using a Ziegler Natta type catalyst and a comonomer, such as hexene, heptene or octene, or a mixture thereof, to provide a suitable degree of short chain branching, and no or substantially no long chain branching. The LLDPE used in the inventive prestretched polyethylene films has a low density compared to LLDPE typically used in prior art polyethylene films, particularly films for agricultural applications.

According to some embodiments, the LLDPE substantially free from LCB is an LLDPE is produced using a Ziegler Natta catalyst and hexene, heptene or octene or a mixture thereof as comonomer. In some embodiments the comonomer is hexene or octene. Preferably, the LLDPE substantially free from LCB comprises from about 85% to about 98% by weight of recurring units of ethylene and from about 2% to about 15% by weight of recurring units of hexene, heptene or octene.

The prestretched film comprises at least one polyethylene, and at least 25% by weight (of the total film weight) of a LLDPE substantially free from LCB and having a density below 915 kg/m$^3$, such as between 910 and 915 kg/m$^3$. The film may additionally comprise other polyolefin components, including other types of polyethylene. The portion of the prestretched polyethylene film not made up of the LLDPE substantially free from LCB and having a density below 915 kg/m$^3$ may comprise other types of LLDPE, LDPE, and other polyolefins and additives commonly used in the manufacture of prestretched polyethylene films. Examples of additional polyolefin components include LLDPE having higher density, low density polyethylene (LDPE), and very low density polyethylene (VLDPE), as well as polypropylenes and polybutylenes.

For example, the film may additionally comprise LLDPE of higher density, for instance has a density of about 918 kg/m$^3$. However, in embodiments where the prestretched polyethylene film comprises a mixture of LLDPE substantially free from LCB having a density below 915 kg/m$^3$ and higher density LLDPE, the LLDPE mixture may typically have a density below 916 kg/m$^3$, below 915 kg/m$^3$, or even below 914 kg/m$^3$.

In embodiments of the invention, the film may include LDPE. The LDPE content typically gives more uniform stretching and may also provide adhesive properties to the film. According to the invention, the total content of LDPE may be in the range of about 0.1-20% by weight, preferably about 2.5-10% by weight.

According to embodiments, the prestretched polyethylene film is a coextruded multi-layer blown film comprising at least two layers. Preferably, the prestretched polyethylene film is a multi-layer film comprising at least three layers: at least one core layer arranged between two exterior layers.

In embodiments, the core layer includes a mixture of (1) LLDPE substantially free from LCB and having a density below 915 kg/m$^3$; and (2) higher density LLDPE. The LLDPE mixture has a density below 916 kg/m$^3$, 915 kg/m$^3$, or even below 914 kg/m$^3$.

The at least one core layer may preferably have from about 25 to 95%, about 30 to 95%, or from about 40 to 95% by weight of the LLDPE substantially free from LCB and having a density below 915 kg/m$^3$, based on the total weight of the at least one core layer. For instance, the at least one core layer may have the LLDPE substantially free from LCB and having a density below 915 kg/m$^3$, at a content of from about 40% to 90% by weight based on the total weight of the core layer, such as from 40 to 70%, 40 to 60%, or 45 to 55% by weight based on the total weight of the core layer.

The prestretched polyethylene film according to embodiments of the invention may include two exterior layers. Such exterior layers sandwich the at least one core layer, i.e. the core layer is arranged between two exterior layers. By "exterior layer" is meant a layer forming at least part of a surface of the film.

The exterior layers may be of identical or similar composition, or may differ in composition with respect to one another. However, an exterior layer typically comprises a thermoplastic polymer, such as a polyolefin, as a base material. Examples of suitable base materials for an exterior layer include polyethylene, especially LLDPE or VLDPE, and ethylene-vinyl acetate co-polymer.

The core layer and the exterior layers may have different compositions. At least one of the exterior layers may comprise a polymer such as ethylene vinyl acetate copolymer (EVA) or ethylmethacrylate copolymer (EMA).

The at least one core layer may form from about 50% to 90%, such as from 70% to 80%, by weight of total weight of the prestretched polyethylene film. In a prestretched polyethylene film comprising one core layer, the one core layer may form from 50% to 90%, such as from 70% to 80% by weight of the total weight of the prestretched polyethylene film. In a prestretched polyethylene film comprising more than one core layer, e.g. 2-5 core layers, such as 3-5 core layers, the total number of core layers may form from 50% to 90%, such as from 70% to 80%, by weight of total weight of the prestretched polyethylene film.

The two exterior layers may together form from 10% to 50%, such as from 20% to 30% by weight of the total weight of the prestretched polyethylene film. Typically, each exterior layer forms about 10% by weight of total weight of the prestretched polyethylene film.

The prestretched polyethylene film may have total film thickness within the range of from 5 to 50 µm. From an economic perspective, this film may be preferable as thin films means lower materials cost. The prestretched polyethylene film may have a thickness of at most 35 µm, at most 30 µm, at most 25 µm, at most 22 µm, or at most 20 µm. However, the thickness is typically at least 5 µm, at least 8 µm, at least 9 µm, at least 10 µm, at least 12 µm or at least 13 µm. Thus, for example, the thickness of the inventive film may be in the range of from 8 to 25 µm.

In embodiments, the prestretched polyethylene film includes one core layer. The thickness of the one core layer may represent from about 60% to 90% of the total film thickness. Alternately, the prestretched polyethylene film may include more than one core layer, in which case the thickness of the total number of core layers may represent from 60% to 90% of the total film thickness. Accordingly, the thickness of each of the exterior layers may be in the range of 5-10% of the total film thickness.

In an example, a prestretched polyethylene film comprising one core layer and two exterior layers sandwiching the core layer may have a total film thickness of 17 μm. The core layer may have a thickness of 13 μm and each of the exterior layers has a thickness of 2 μm.

In embodiments of the invention, the prestretched polyethylene film may include a tackifier. Typically, at least one of the exterior layers may include a tackifier.

Conventional tackifiers, known to the person skilled in the art, may be added to the prestretched polyethylene film. Examples of conventional tackifiers include soft polymers and migrating tackifiers. A soft polymer may provide a relatively soft surface which may increase friction, and reduce slip in a direction substantially parallel to the film surface. A migrating tackifier, on the other hand, may provide an adhesive surface that increases the friction in a direction substantially perpendicular to the film surface.

Examples of suitable soft polymers include ethylene vinyl acetate co-polymer (EVA), ethyl methacrylate co-polymer (EMA), and very low density polyethylene (VLDPE). Hence, in embodiments where an exterior layer comprises EVA, EMA, or VLDPE as a base material, this may provide sufficient cling, such that it may not be necessary to add a further tackifier. Optionally however, a layer comprising a soft polymer may also comprise a migrating tackifier.

In an example, the cling of at least one exterior layer may be achieved by the use of a soft polymer, or a combination of soft polymers, in at least one exterior layer.

VLDPE may be added to at least one exterior layer in order to provide cling to the at least one exterior layer. In an embodiment, the content of VLDPE may be up to 100% by weight of the at least one exterior layer. For instance, one exterior layer may consist of 100% VLDPE.

According to embodiments, the tackifier is a migrating tackifier. The term "migrating tackifier" as used herein means a tackifier which is soluble in the film material, e.g. in polyethylene. A migrating tackifier may migrate within a material, including within a single layer, as well as from one layer to an adjacent layer. In embodiments of the invention, a migrating tackifier may migrate from any one of the layers of the prestretched polyethylene film (e.g. the core layer) to the film surface of the prestretched polyethylene film (typically the surface of an exterior layer). A migrating tackifier may provide an adhesive surface which increases the friction in a direction substantially perpendicular to the film surface.

A migrating tackifier may be added to one or more layers of the prestretched polyethylene film, typically including the thickest layer(s) of the prestretched polyethylene film. When the prestretched polyethylene film has more than one core layer, the migrating tackifier may be added to one or more, including all, of the core layers. Alternately, the migrating tackifier may be added to the thickest of the core layers. Upon saturation of the thickest layer(s) with regard to the migrating tackifier, the excess of migrating tackifier may migrate into adjacent layer(s). For example, the migrating tackifier may be initially added to the core layer, and upon saturation of the core layer, the excess of migrating tackifier may migrate into the two exterior layers sandwiching the core layer. Typically, also the exterior layers are saturated with the migrating tackifier, thereby allowing the migrating tackifier to migrate through the exterior layers and accumulate at the exterior surfaces of the exterior layers providing cling.

The cling of at least one of the exterior layers may be achieved by addition of a migrating tackifier to the at least one core layer. The migrating tackifier will initially be comprised in the core layer, and over time migrate to the exterior layers. The content of migrating tackifier added to the at least one core layer may exceed the content of migrating tackifier required to saturate the at least one core layer with regard to the migrating tackifier.

The migrating tackifier may be soluble in polyethylene and other polyolefins. Thus, the content required to saturate the at least one core layer may depend on the content of polyethylene and other polyolefins, in which the migrating tackifier is soluble, in the at least one core layer.

The at least one core layer may include migrating tackifier, e.g. in the form of polyisobutylene (PIB), at a content of from 0 to 15% by weight, e.g. from 1 to 15% by weight, such as from 3 to 7% by weight, based on the total weight of the at least one core layer. In an embodiment, the at least one core layer comprises approximately 5% by weight of PIB.

More specifically, in embodiments, the prestretched polyethylene film includes only one core layer. A migrating tackifier, e.g. in the form of PIB, may be present in the core layer at a content of from 0 to 15% by weight, e.g. from about 1 to 15% by weight, such as from about 3 to 7% by weight, based on the total weight of the one core layer. The one core layer may include approximately 5% by weight of PIB.

In other embodiments, the prestretched polyethylene film comprises more than one core layer, such as two or more core layers arranged adjacent each other. A migrating tackifier, e.g. PIB, may be present in one or more of the core layers at a content of from 0 to 15% by weight, e.g. from about 1 to 15% by weight, such as from about 3 to 7% by weight based on the total weight of the total number of core layers. The core layers may together comprise approximately 5% by weight of PIB. It is envisaged that when the prestretched polyethylene film comprises multiple core layers, a tackifier could initially be contained in only one of the core layers, or in several or all of the core layers. Typically, however, due to the nature and purpose of a migrating tackifier, with time all of the layers may contain the tackifier, even if the tackifier was added only to one of the core layers during manufacture of the multi-layer film.

The soft polymer EVA may be used in combination with the migrating tackifier PIB in order to provide cling to at least one exterior layer. For example, PIB may be added to the core layer at a content that is sufficient to allow migration to the exterior surface of at least one of the exterior layers upon saturation of the core layer and the at least one exterior surface. EVA may be comprised in the at least one exterior layer. An advantage of combining a soft polymer, e.g. EVA, and a migrating tackifier, e.g. PIB, in at least one exterior layer is that the cling may be improved due to increased resistance of the exterior layer to forces both substantially parallel as well as substantially perpendicular to the exterior surface of the exterior layer.

Suitable contents of at least one of a migrating tackifier, a soft polymer and a combination thereof, in the at least one core layer and/or in any or both of the two exterior layers of the prestretched polyethylene film are known to the person skilled in the art.

According to embodiments, the prestretched polyethylene film further comprises an agent being selected from a pigment and a UV stabilizer. A pigment may be advantageous for varying the color and/or the opacity of the prestretched polyethylene film further. A UV stabilizer may be advantageous for preventing chain reactions caused by, e.g., radicals within the polyolefin layer(s) of the prestretched polyethylene film, e.g., during storage outdoors. A UV stabilizer may be particularly desirable when the prestretched polyethylene film is to be used as the sole cover for a compressed product, e.g. as a net replacement film for agricultural bales without the use of further protective wrapping.

The term "UV stabilization" as used herein means protection of a material from the long-term degradation effects from light, most frequently ultraviolet radiation (UV).

The prestretched polyethylene film according to embodiments of the invention may comprise a UV stabilizer, contained in at least one layer of the multi-layer film. Conventional UV stabilizer, known to the person skilled in the art, may be added for example to the at least one core layer. A UV stabilizer typically traps free radicals generated in the polyolefin material by UV irradiation, and may thus prevent chain reactions within the polyolefin layer(s) of the prestretched polyethylene film, which would otherwise result in degradation of the polyolefin material.

In embodiments of the invention, all layers of the prestretched polyethylene film may comprise a UV stabilizer. A good UV stabilization of the film material is desirable in order to avoid that the prestretched polyethylene film degrades during storage time outdoors which typically may be up to a year.

Examples of suitable UV stabilizers are Chimassorb 944 (BASF, Italy), Tinuvin 622 (BASF, Germany), and Chimassorb 2020 (BASF, Italy). A pigment, such as $TiO_2$ or CB, may also function as a UV stabilizer. The at least one core layer may comprise UV stabilizator in a range of from 0 to 0.6% by weight based on the total weight of the at least one core layer.

The prestretched polyethylene film may be either blown or cast. A blown film has been melted and thereafter air-cooled when blown out. A cast film has been cooled over cooling rollers. The blown or cast precursor film is then stretched in-line or off-line to form a prestretched film.

FIG. 1 illustrates an exemplary method of producing the prestretched polyethylene film according to embodiments of the invention. A film composition comprising at least 25% by weight of a linear low density polyethylene (LLDPE) substantially free from long chain branching (LCB) and having a density below 915 kg/m³ is extruded from a blow extruder 1 to form a blown film bubble that is advanced through primary nip rollers 1a. The nip roller nips together the blown film. From the primary nip rollers, the tubular film 2 is passed via guide rollers to the stretch unit 3, where stretching is performed between two rollers, first draw roller 4 and second draw roller 5, having different speeds. After being stretched in the stretch unit 3, the tubular film is passed to a dividing station 6 where the edges of the film 2 may be cut to provide two individual sheets of film. Next, the film 2 is passed to the secondary nip rollers 7 where the individual sheets of film 8 may be separated. Each film sheet 8 may optionally pass through a second dividing station (not shown) where the sheet may be divided longitudinally into two or more parallel sections. Finally, the film sheets, or film sheet sections, are wound onto the winders 9. In embodiments of the invention where the edges of the tubular film are not cut in the dividing station 6, the tubular film is typically wound onto one of the winders 9.

The prestretched film according to the invention has a degree of prestretching in the range of from about 100% to 400%.

In order to achieve the desired prestretching, the film may be stretched in the stretch unit 3 and subsequently relaxed. For example, the precursor film may be stretched by more than the desired final degree of prestretching and partially relaxed. For instance, the film may be stretched in the stretch unit by 180% and then relaxed to provide a prestretched film having a prestretching degree of 150%. Hence, as used herein, the expression "degree of prestretching" refers to the degree of prestretching of the manufactured film, which is optionally relaxed, and not necessarily to the maximum degree of stretching experienced by the film during the manufacturing process. The stretching is typically conducted at a temperature in the range of 20° C. to 70° C.

The prestretched film has a remaining elongation capability, in relation to its prestretched length, of from about 100% to less than 300% as determined according to ASTM D882. The remaining elongation capability is dependent on the film material and the stretch ratio of the prestretched film. Typically, for a film according to the invention, the elongation capability includes both an elastic and a plastic (irreversible) component. Thus, upon further stretching and relaxation of the prestretched film, part of the elongation achieved during the further stretching is reversed during relaxation and the film thus obtains a final length in the range between the first prestretched length and the maximum length during the further stretching step.

A multilayer prestretched polyethylene film comprising at least three layers according to embodiments of the invention may be produced by a manufacturing process as described herein. The process includes providing a first extrudible composition comprising at least 25% by weight of LLDPE substantially free from LCB and having a density below 915 kg/m³. The process continues by providing at least one additional extrudible composition comprising at least one polymer. The first composition is extruded to form at least one core layer, and the at least one additional extrudible composition is extruded to form two exterior layers on opposing sides of the core layer.

According to embodiments, the linear low density polyethylene (LLDPE) substantially free from long chain branching (LCB) is produced using a Ziegler Natta catalyst and hexene, heptene or octene as comonomer and has a density of below 915 kg/m³, such as between 910 and 915 kg/m³.

The first extrudible composition is intended to form a core layer. The first extrudible composition, which includes at least 25% by weight of LLDPE substantially free from LCB and has a density below 915 kg/m³, may be mixed with at least one other polyolefin and optionally at least one additive, e.g. selected form the group consisting of: UV stabilizers, pigments, and tackifiers.

The at least one additional extrudible composition is typically intended to form one of the exterior layers or both exterior layers. The step of providing at least one additional extrudible composition comprising at least one polymer may imply providing a second extrudible composition comprising at least one polymer. Optionally, also a third extrudible composition comprising at least one polymer may be provided. In particular, in embodiments where the exterior layers have different compositions, the second extrudible composition is intended to form one of the exterior layers, and the third extrudible composition is intended to form the other one of the exterior layers.

For example, the second extrudible composition may be provided by mixing a soft polymer with optionally at least one additive selected form the group consisting of: UV stabilizers and tackifiers. The second extrudible composition is typically adapted to provide cling. The third extrudible composition may be provided by mixing a polyolefin, e.g. a polyethylene, with optionally at least one additive selected form the group consisting of: UV stabilizers and tackifiers. The third extrudible composition may be adapted to provide a low friction surface.

Optionally, a single additional extrudible composition may be provided, which may be adapted to provide cling and/or a low friction surface.

The step of extruding the first composition to form at least one core layer may imply that the first composition is extruded to a single core layer or to multiple core layers. Typically, in the case of multiple core layers, the multiple core layers are extruded simultaneously by coextrusion and adhere to each other due to substantially identical chemical properties.

The step of extruding the at least one additional extrudible composition to form two exterior layers on opposing sides of the core layer may imply extruding the second extrudible composition to form a first exterior layer on a first side of the core layer and extruding the third extrudible composition to form a second exterior layer on a second side of the core layer, wherein the first side of the core layer is arranged opposite to the second side of the core layer.

Alternately, the single additional extrudible composition is extruded to form two exterior layers on opposing sides of the core layer.

The steps of extruding the first extrudible composition to form at least one core layer and the additional extrudible composition to form two exterior layers, respectively, may be performed separately from each other, e.g., by monoextrusion, or simultaneously, e.g., by coextrusion. Typically, the prestretched polyethylene film is prepared by co-extrusion, using one extruder per layer simultaneously. Monoextrusion and coextrusion are techniques generally known to the person skilled in the art.

The prestretched film according to the invention may be used as a first contact layer for wrapping compressed bulk material.

Figure 2:
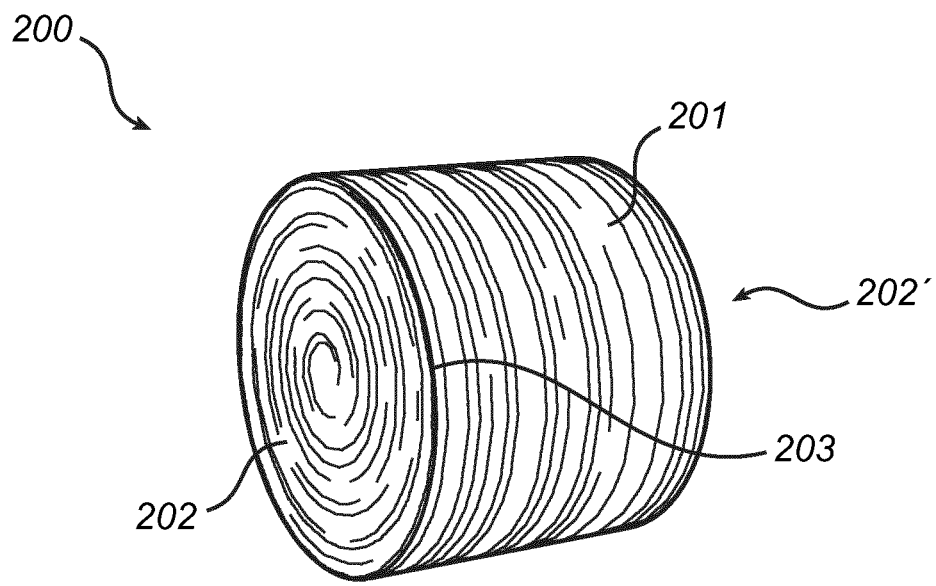
FIG. 2 is a perspective view of a round bale illustrating the shape and features referred to in the description of the present invention.

FIG. 2 illustrates a typical agricultural round bale 200, e.g. for silage production. The bale 200, having been compressed in the baling chamber of the baler (not shown), has a generally cylindrical shape comprising an envelope surface 201 and two side surfaces 202, 202'. The edge of the bale is denoted with reference number 203.

When used in a baling process, the prestretched film according to the invention is typically provided in the form of a film roll mounted in the baler used for the baling, and is dispensed from the roll via film dispensing means to a stretch unit provided in the baler, where the film is subjected to a further stretching, effected in one or more stretching steps. In the stretch unit of the baler the prestretched film may be stretched longitudinally by 2-150%, for example at 10-50% and typically by at least 12%, at least 15% or at least 18% relative to its prestretched length. Next, the film is applied under tension on the bale, still within the baling chamber. Balers provided with means for holding a film roll, film dispensing means, and a stretch unit are known in the art and may be employed in a method according to the invention.

When used in baling of compressed bulk material, the prestretched polyethylene film described herein may prevent further expansion of the compressed material, and it may even be capable of further reducing the bale volume relative to the volume of the compressed bulk material in the baling chamber, due to its elastic properties.

In use, the prestretched polyethylene film may be applied at least about 1.5 turns around the bale in the circumferential direction, such that at least about half of the envelope surface of the bale is covered by two layers of the film and the remaining part of the envelope surface of the bale is covered by a single layer of the film. By applying the film with at least half a turn of overlap between film layers, a film comprising a tackifying agent as described above adheres sufficiently firmly to itself in order to exert the force(s) necessary on the bale. The present film may also be applied more than 1.5 turns around the bale, for example, the film may be applied to provide from 2 to 10 layers of film as measured centrally on the envelope surface of the bale. Typically, from 3 to 5 layers of film are applied around the bale.

If the film does not contain a tackifying agent, the film must be attached by other means when applied on the bale. Examples of such means include tape strips and adhesive, which can be applied on the film, e.g. in the layer overlap area, in order for the subsequent film layer to adhere to the preceding film layer.

The inventive film is typically applied on the bale, in the circumferential direction, as a first contact layer. That is, the first layer of film is applied directly onto the bulk material. Typically, no netting or other film is applied around the bale before applying the present film. Hence, the film can be used for replacing the net, thus avoiding many drawbacks of conventional baling methods, while also offering the new advantage of reducing the volume of the bale.

When the desired number of layers of film have been applied, the film is cut and, if necessary, attached to the subsequent layer and then the wrapped bale is ejected from the baling chamber.

Figure 3:
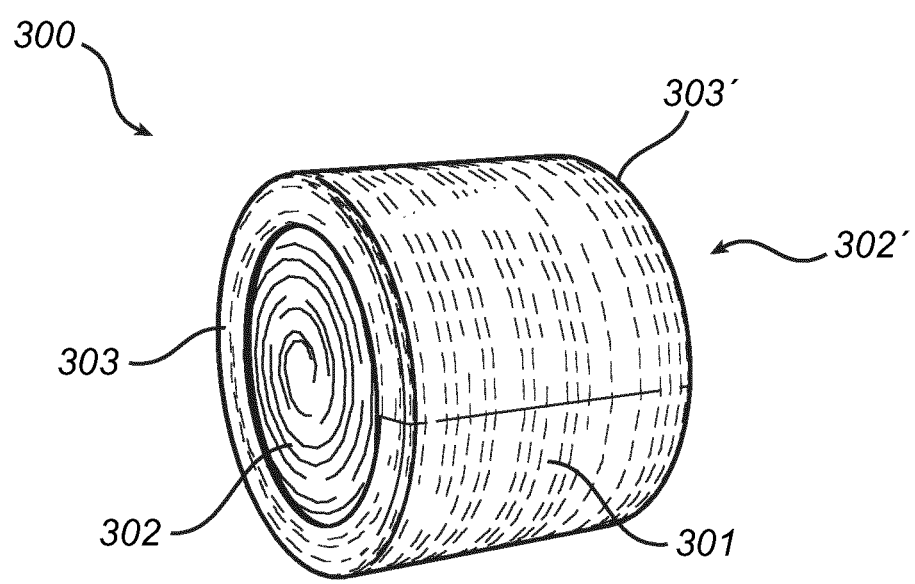
FIG. 3 is a perspective view of a round bale wrapped with a prestretched polyethylene film according to embodiments of the invention as a net replacement film.

FIG. 3 illustrates around bale 300 wrapped with the film according to the invention. The film has been applied on the envelope surface 301 in the circumferential direction. Further, as illustrated in this figure, the film may be applied such that part of the film extends over the edges 303, 303' of the bale and covers part of the side surface 302 and/or 302'. Applying the film over the edges of the bale reduces the risk for puncturing and avoids the formation of air pockets underneath the wrapping.

In embodiments of the invention, the film may be wide enough when applied on the bale to cover by a single layer the entire width of the bale of the bale, and preferably such that it also extends over both edges of the bale. Thus, maximum coverage of the bale, and therefore maximum compressive force by the film, may be achieved using the fewest layers of film.

In alternate embodiments, the film may have a width which is equal to or even smaller than the length of the bale envelope surface.

According to embodiments of the invention, the film may be shifted relative to the bale in the direction transverse to the film feeding direction (i.e., shifted sideways along the width of the bale) such that a first layer of film extends over the edge 303 (but not edge 303') and covers part of the side surface 302 (but side surface 302') while a subsequent layer instead extends over the edge 303' and covers part of the side surface 302'. However, it is also contemplated that the film may applied on the envelope surface only, and not to extend over any of the edges 303, 303' (whether shifted transversely or not).

In yet other embodiments of the invention, when the film has a width which is equal to or even smaller than the length of the bale envelope surface 201, it may be advantageous to wrap the bale using two rolls of the film of the invention by applying the film from the first roll such that it covers part of the envelope surface and extends over the edge 303 and cover part of the side surface 302, and subsequently or simultaneously applying the film from the other roll such that it covers the part of envelope surface not covered by the film from the first roll and partly overlaps the first film, and extends over the edge 303' of the bale and covers part of the side surface 302'.

A round bale wrapped with the net replacement film of the invention may be subsequently wrapped with a conventional protective film as described above.

However, as is readily appreciated by a person skilled in the art, the prestretched polyethylene film of present invention is not only useful in the production of silage; in fact, any advantages and effects obtained using the film described herein may be beneficial when the film is used for wrapping any sort of compressed bulk material, agricultural or other. For example, the prestretched film of the invention may be used for wrapping hay, pressed sugar beet pulp, various crops such as maize, corn or grain, or waste matter, or material for energy recovery.

Thus, the person skilled in the art realizes that the present invention by no means is limited to the preferred embodiments described above. On the contrary, many modifications and variations are possible within the scope of the appended claims. Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

EXAMPLES

Preparatory Example 1

Prior Art Net Replacement Film of 150% Prestretch

A three-layer film was prepared by blown film co-extrusion of a first, a second, and a third extrudible composition. The first extrudible composition comprised a conventional LLDPE used for agricultural stretch film applications, having a density of 918 kg/m$^3$. The first extrudible composition also contained conventional amounts of pigment ($TiO_2$) and a UV stabilizer. The second extrudible composition comprised LLDPE conventionally used for agricultural stretch film applications and a conventional amount of an UV stabilizer. The third extrudible composition comprised EVA, with PIB and UV stabilizer additives, as conventionally used in the art.

The extrudible compositions were each mixed separately using blending devices or mixing devices generally known to a person skilled in the art.

By means of coextrusion, a core layer was formed of the first extrudible composition and two exterior layers sandwiching the core layer were formed of the second extrudible composition and the third extrudible composition, respectively. The coextruded film was blown and subsequently subjected to prestretching followed by relaxation to form a film having a degree of prestretching of 150%. The core layer and the exterior layers together formed a prestretched polyethylene film of a total thickness of about 17 μm. The second extrudible composition provided cling to the prestretched polyethylene film. The third extrudible composition provided a low friction surface to the prestretched polyethylene film.

Several tests were performed to analyze the mechanical properties of the prestretched polyethylene film. The results of the tests are summarized in Table 1.

Preparatory Example 2

Prior Art Net Replacement Film of 200% Prestretch

First, second, and third extrudible compositions were prepared according to Preparatory Example 1. By means of coextrusion, a core layer was formed of the first extrudible composition and two exterior layers sandwiching the core layer were formed of the second extrudible composition and the third extrudible composition, respectively. The coextruded film was blown and subsequently subjected to prestretching followed by relaxation to form a film having a degree of prestretching of 200%. The core layer and the exterior layer together formed a prestretched polyethylene film of a total thickness of about 17 μm.

Several tests were performed to analyze the mechanical properties of the prestretched polyethylene film. The results of the tests are summarized in Table 1.

Preparatory Example 3

Inventive Net Replacement Film of 150% Prestretch with LLDPE Substantially Free from Long Chain Branching (LCB) and Having a Density Below 915 kg/m$^3$ A first, a second, and a third extrudible composition were each prepared according to Preparatory Example 1 with the exception that part of the conventional LLDPE of the first extrudible composition was replaced with an LLDPE substantially free from long chain branching and with a density of 912 kg/m$^3$ and a melt flow index ($MI_2$ measured at 190° C. with a 2.16 kg weight) of 1.0 g/10 min, at a content of 42.85% by weight of the total film.

By means of coextrusion, a core layer was formed of the first extrudible composition and two exterior layers sandwiching the core layer were formed of the second extrudible composition and the third extrudible composition, respectively. The coextruded film was blown and subsequently subjected to prestretching followed by relaxation to form a film having a degree of prestretching of 150%. The core layer and the exterior layer together formed a prestretched polyethylene film of a total thickness of about 16 μm.

Several tests were performed to analyze the mechanical properties of the prestretched polyethylene film. The results of the tests are summarized in Table 1.

Preparatory Example 4

Inventive Net Replacement Film of 200% Prestretch with LLDPE Substantially Free from Long Chain Branching (LCB) and Having a Density Below 915 kg/m$^3$ A first, a second, and a third extrudible composition were each prepared according to Preparatory Example 1 with the exception that part of the conventional LLDPE of the first extrudible composition was replaced with an LLDPE substantially free from long chain branching and with a density of 912 kg/m$^3$ and a melt flow index ($MI_2$ measured at 190° C. with a 2.16 kg weight) of 1.0 g/10 min, at a content of 42.85% by weight of the total film.

By means of coextrusion, a core layer was formed of the first extrudible composition and two exterior layers sandwiching the core layer were formed of the second extrudible composition and the third extrudible composition, respectively. The coextruded film was blown and subsequently subjected to prestretching followed by relaxation, to form a film having a degree of prestretching of 200%. The core layer and the exterior layer together formed a prestretched polyethylene film of a total thickness of about 16 μm.

Several tests were performed to analyze the mechanical properties of the prestretched polyethylene film. The results of the tests are summarized in Table 1.

TABLE 1

Test results for films prepared according to Preparatory Examples 1-4

| Ex. # | Prestretch [%] | Dartdrop [g] | MD Ultimate tensile strength [MPa] | Thickness [μm] | MD Elong. at break [%] |
|---|---|---|---|---|---|
| 1 | 150% | 85 | 72.8 | 17.1 | 150 |
| 2 | 200% | 130 | 81.9 | 17.0 | 119 |
| 3 | 150% | 125 | 74.6 | 16.4 | 170 |
| 4 | 200% | 260 | 94.6 | 15.8 | 137 |

In Table 1, examples 1 and 2 represent prior art films having a conventional LLDPE content. Examples 3 and 4 represent films comprising at least 25% by weight of an LLDPE substantially free from long chain branching (LCB) and having a density of between 910 and 915 kg/m³.

The tests showed that the inventive films (Examples 3 and 4) each has a higher remaining elongation capability compared to the respective conventional film of the same prestretching degree (Examples 1 and 2). The inventive films also exhibit improved mechanical performance in terms of impact resistance (dart drop) and ultimate tensile strength, than each respective comparative film, despite the fact that the inventive films were slightly thinner than the prior art films.

The invention claimed is:

1. A prestretched polyethylene film having a longitudinal degree of prestretching in the range of from 150% to 400% and a remaining longitudinal elongation capability in the range of from 150% to 290% based on a length of the prestretched film as determined according to ASTM D882, wherein:
   the film comprises at least 25% by weight of a first linear low density polyethylene (LLDPE);
   the first LLDPE has a density of between 910 and 915 kg/m³ and is substantially free from long chain branching (LCB); and
   the film comprises a second linear low density polyethylene (LLDPE) having a density of about 918 kg/m³.

2. The prestretched polyethylene film according to claim 1, wherein the film comprises 35-95% by weight of said first linear low density polyethylene (LLDPE).

3. The prestretched polyethylene film according to claim 1, wherein the film comprises 40-95% by weight of said first linear low density polyethylene (LLDPE).

4. The prestretched polyethylene film according to claim 1, wherein the first linear low density polyethylene (LLDPE) is produced using a Ziegler Natta catalyst and hexene, heptene or octene as comonomer.

5. The prestretched polyethylene film according to claim 1, wherein the first linear low density polyethylene (LLDPE) has a density of between 911 and 913 kg/m³.

6. The prestretched polyethylene film according to claim 1, wherein the first linear low density polyethylene (LLDPE) has a melt flow index in the range of 0.7-1.3 g/10 min as determined according to ASTM D1238 (190° C., 2.16 kg weight).

7. The prestretched polyethylene film according to claim 1, wherein said film has a thickness in the range of from 5 to 50 μm.

8. The prestretched polyethylene film according to claim 1, wherein said film has a remaining longitudinal elongation capability of from 150% to 250%.

9. The prestretched polyethylene film according to claim 1, wherein the first LLDPE has a melt flow index in the range of 0.9-1.1 g/10 min as determined according to ASTM D1238 (190° C., 2.16 kg weight).

10. The prestretched polyethylene film according to claim 1, wherein the prestretched film has a thickness in the range from 8 to 25 μm.

11. The prestretched polyethylene film according to claim 1, wherein said film has a longitudinal degree of prestretching in the range of from 200% to 350%.

12. The prestretched polyethylene film according to claim 1, wherein said film is a coextruded blown film comprising at least two layers.

13. The prestretched polyethylene film according to claim 12, wherein at least one of said at least two layers comprises 40-99% by weight of said first linear low density polyethylene (LLDPE).

14. The prestretched polyethylene film according to claim 12, wherein the film comprises at least one core layer arranged between two exterior layers, wherein said at least one core layer comprises 40-99% by weight of the first linear low density polyethylene (LLDPE).

15. A method of forming a bale of compressed bulk material, comprising:
   a) forming a cylindrical bale of compressed bulk material, and
   b) applying the film of claim 1, under tension, in the circumferential direction around the cylindrical bale.

16. The method according to claim 15, further comprising, prior to step b, a step of further stretching the prestretched film of claim 1 by 10-50% relative to the length of the prestretched film.

17. The method according to claim 15, wherein the film is applied as a first contact layer, in direct contact with the compressed bulk material.

18. A method of producing a prestretched polyethylene film comprising:
   providing a blown or cast precursor film comprising at least 25% by weight of a first linear low density polyethylene (LLDPE) having a density of between 910 and 915 kg/m³ and a second linear low density polyethylene (LLDPE) having a density of about 918 kg/m³, said first LLDPE being substantially free from long chain branching (LCB); and
   stretching the precursor film in-line or off-line to form the prestretched film;
   wherein:
      the prestretched film has a degree of prestretching in the range of from 150% to 400% and a remaining longitudinal elongation capability in the range of from 150% to 290% as determined according to ASTM D882.

19. The method of claim 18, wherein the precursor film is stretched by more than the desired final degree of prestretching and partially relaxed.

* * * * *